US012591386B2

(12) United States Patent
Martin et al.

(10) Patent No.: US 12,591,386 B2
(45) Date of Patent: Mar. 31, 2026

(54) DATA REDUCTION MANAGEMENT

(71) Applicant: Dell Products L.P., Round Rock, TX (US)

(72) Inventors: Owen Martin, Hopedale, MA (US); Ramesh Doddaiah, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/762,721

(22) Filed: Jul. 3, 2024

(65) Prior Publication Data

US 2026/0010310 A1    Jan. 8, 2026

(51) Int. Cl.
*G06F 12/00* (2006.01)
*G06F 3/06* (2006.01)

(52) U.S. Cl.
CPC .......... *G06F 3/0653* (2013.01); *G06F 3/0608* (2013.01); *G06F 3/067* (2013.01)

(58) Field of Classification Search
CPC ....... G06F 3/0622; G06F 3/0665; G06F 3/067
USPC ........................................................ 711/163
See application file for complete search history.

(56) References Cited

U.S. PATENT DOCUMENTS

2014/0304428 A1* 10/2014 Fischer-Toubol ...........................
G06F 11/3419
710/5
2017/0235774 A1* 8/2017 Colgrove ................ G06F 16/22
707/693
2019/0220217 A1* 7/2019 Kimmel ................ G06F 3/0649
2021/0271757 A1* 9/2021 Horspool ............ H04L 63/1416
2023/0273727 A1* 8/2023 Zhou .................... H03M 7/6047
711/154
2024/0192869 A1* 6/2024 Natu ..................... G06F 9/5016

* cited by examiner

*Primary Examiner* — Mohamed M Gebril
(74) *Attorney, Agent, or Firm* — Krishnendu Gupta; Nikhil Patel

(57) ABSTRACT

One or more aspects of the present disclosure relate to managing data reduction in a storage system during burst workloads. In embodiments, input/output (IO) operations received by a storage array are monitored to identify a burst workload based on a predefined threshold of IO operations per second (IOPS). In addition, the compression of data corresponding to IO write operations in the burst workload is deferred during the identified burst workload by temporarily storing the data in an uncompressed format. Further, the data is compressed during a self-healing period after a delay period. For example, the delay period is after the identified burst workload.

20 Claims, 5 Drawing Sheets

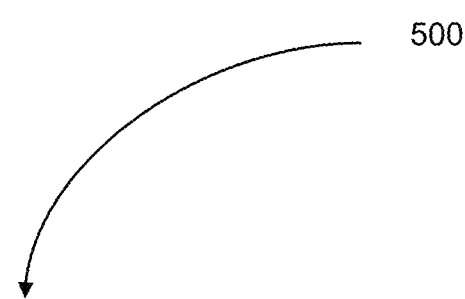

500 monitoring IO operations received by a storage array to identify a burst workload based on a predefined threshold of IOPS

502 deferring compression of data corresponding to IO write operations in the burst workload during the identified burst workload by temporarily storing the data in an uncompressed format

504 compressing the data during a self-healing period after a delay period, wherein the delay period is after the identified burst workload

DATA REDUCTION MANAGEMENT

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to managing data reduction in a storage system during burst workloads. In embodiments, input/output (IO) operations received by a storage array are monitored to identify a burst workload based on a predefined threshold of IO operations per second (IOPS). In addition, the compression of data corresponding to IO write operations in the burst workload is deferred during the identified burst workload by temporarily storing the data in an uncompressed format. Further, the data is compressed during a self-healing period after a delay period. For example, the delay period is after the identified burst workload.

In embodiments, the duration of the delay period can be defined based on an availability of storage array resources.

In embodiments, the start and duration of the self-healing period can be defined based on idle resource utilization of the storage array.

In embodiments, a compressibility of the data corresponding to each IO write operation in the burst workload can be determined. Adaptive compression algorithms can also be applied to the data based on its determined compressibility.

In embodiments, light compression or heavy compression can be selected based on the storage array's current load and the compressibility of the data.

In embodiments, the burst workload can be identified by calculating a Burst Heat Index (BHI) for each storage group in the storage array based on a score biased toward IO write operations.

In embodiments, each storage group targeted by IO operations in the burst workload can be identified using the BHI.

In embodiments, an IO signature of the IO operations received by the storage array can be identified.

In embodiments, whether the IO signature of the IO operations matches an IO shapelet defining a burst workload type can be determined.

In embodiments, a burst workload type can be defined based on a threshold of IOPS received by the storage array during a time window threshold.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale; emphasis is instead placed upon illustrating the embodiments' principles.

FIG. 5 is a flow diagram of a method for managing data reduction in a storage array during burst workloads per embodiments of the present disclosure.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

For example, a business can implement data storage systems that manage input/output (IO) operations (e.g., read/write requests) within a storage array. These systems are crucial for efficiently handling large volumes of data, ensuring quick access and reliable information storage across various computing environments. Managing data involves monitoring and optimizing how data is written to and read from storage devices, which is fundamental to enhancing performance and maintaining system stability in response to varying workload demands.

Current naïve storage systems struggle with performance degradation during burst workloads (e.g., periods of intense data activity) due to the intensive use of resources for data compression. These systems typically introduce write pending (WP) delays when handling a burst of write workloads, significantly impacting system performance and reliability. For example, existing data compression algorithms in storage arrays do not adequately address the dynamic nature of burst workloads. During high input/output operations per second (IOPS) periods, these systems experience elongated WP delays, leading to increased read and write latencies. Specifically, the read and write latencies can occur because most of the array's CPU cycles are consumed by compression activities, leaving insufficient resources for handling regular IO operations effectively.

Embodiments of the present disclosure relate to techniques for optimizing data compression during varying workload intensities. Specifically, the embodiments can defer data compression during burst periods and temporarily store the data in an uncompressed format. For example, the embodiments can monitor IO operations to identify burst workloads based on predefined thresholds of IOs per second (IOPS).

Figure 1:
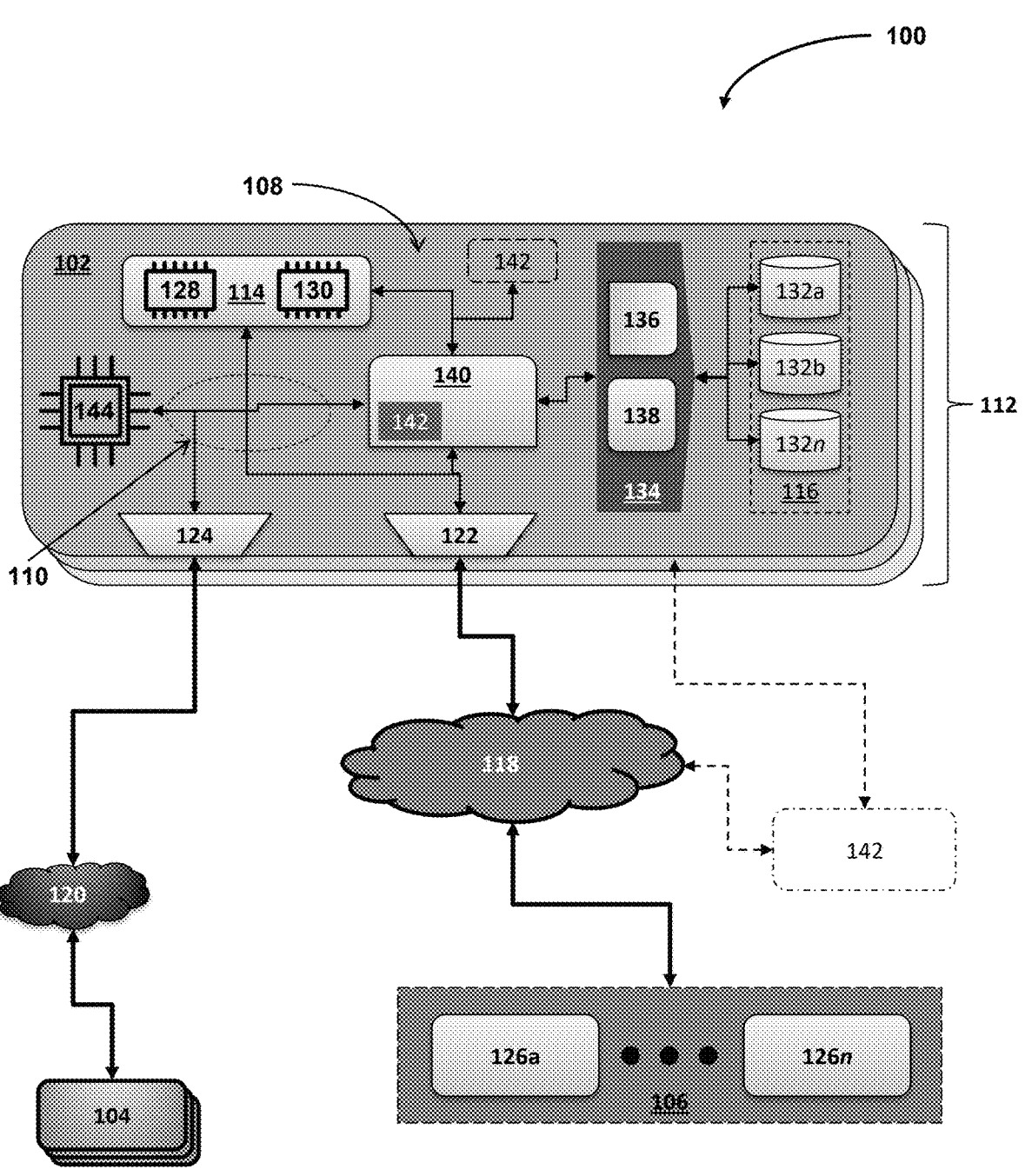
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

Managing large data flow volumes and storage is crucial in today's data-driven world. For example, storage systems, like the storage array 102, face challenges managing data during intense workloads (e.g., burst workloads). Accordingly, the storage array 102 can include a controller 142 (e.g., management system controller) that applies innovative techniques to handling these bursts.

In embodiments, the controller 142 can have an architecture designed to manage the storage array's computing, processing, storage, and memory resources. For example, instead of trying to compress all the data associated with incoming IO requests, which can clog the storage array's resources, the controller 142 can temporarily store the data in its original, uncompressed form. Accordingly, the controller 142 can prevent the storage array 102 from getting bogged down during peak times, ensuring it continues operating smoothly and quickly.

Once the burst of activity subsides, the controller 142 can cause the storage array 102 to enter a "self-healing" period. During this period, the controller 142 can methodically compress the previously stored uncompressed data. Advantageously, the controller 142 can initiate the "self-healing"

period when the storage array 102 is not busy, allowing it to compress the data more efficiently without affecting its overall system performance.

Further, the controller 142 can monitor IO workloads received by the storage array 102 to generate a Burst Heat Index (BHI) that can predict when these bursts will occur. Accordingly, the controller 142 can use the BHI to recognize which parts of the data are experiencing the most intense activity and prioritize them for delayed compression. By implementing such a proactive approach, the storage array 102 can manage its resources better and maintain high performance under heavy workloads.

In addition, the controller 142 can apply adaptive data compression techniques that adjust compression levels based on how busy the storage array 102 is and how compressible the data is. Using such flexible compression techniques, the controller 142 can ensure the storage array's resources are used most effectively.

In embodiments, the controller 142 can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services.

Figure 2:
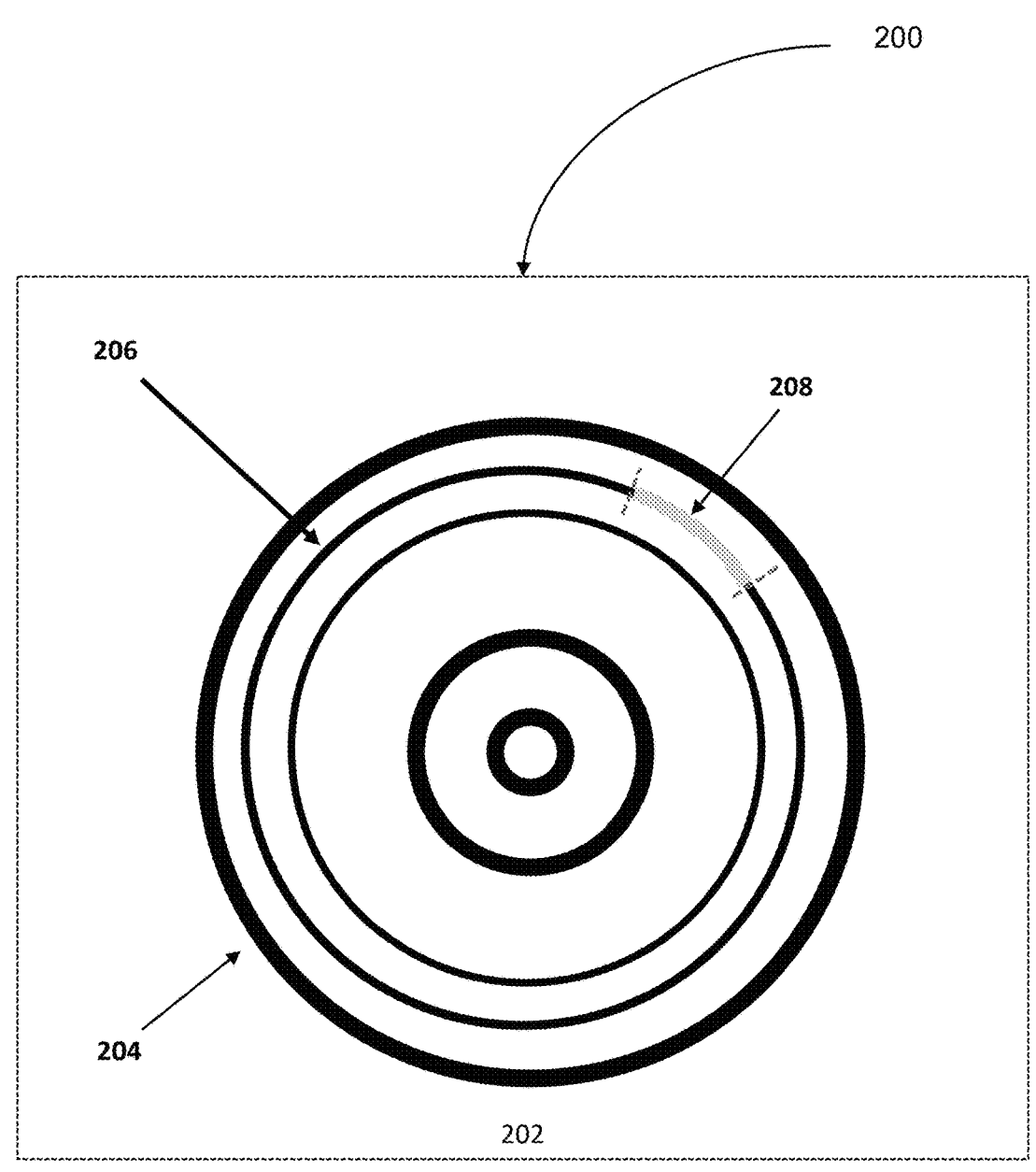
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132*a-n*. For example, the EDS 140 can provide a host, e.g., client machine 126*a*, with a virtual storage device (e.g., thin-device (TDEV)) that logically represents zero or more portions of each storage device 132*a-n*. For example, the EDS 140 can establish a logical track using zero or more physical address spaces from each storage device 132*a-n*. Specifically, the EDS 140 can establish a continuous set of logical block addresses (LBA) using physical address spaces from the storage devices 132*a-n*. Thus, each (LBA) represents a corresponding physical address space from one of the storage devices 132*a-n*. For example, a track can include 256 LBAs, amounting to 128 kb of physical storage space. Further, the EDS 140 can establish the TDEV using several tracks based on a desired storage capacity of the TDEV. The EDS 140 can also establish extents that logically define a group of tracks.

In embodiments, the EDS 140 can provide each TDEV with a unique identifier (ID) like a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 140 can enable the HA 122 to present the hosts 106 with the logical storage representations based on host or application performance requirements.

For example, the persistent storage 116 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can provide each slice/portion with a corresponding logical block address (LBA). The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to the persistent storage 116 or portions thereof (e.g., tracks and address spaces).

As stated herein, the persistent storage 116 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 140 can establish the hierarchy to include one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
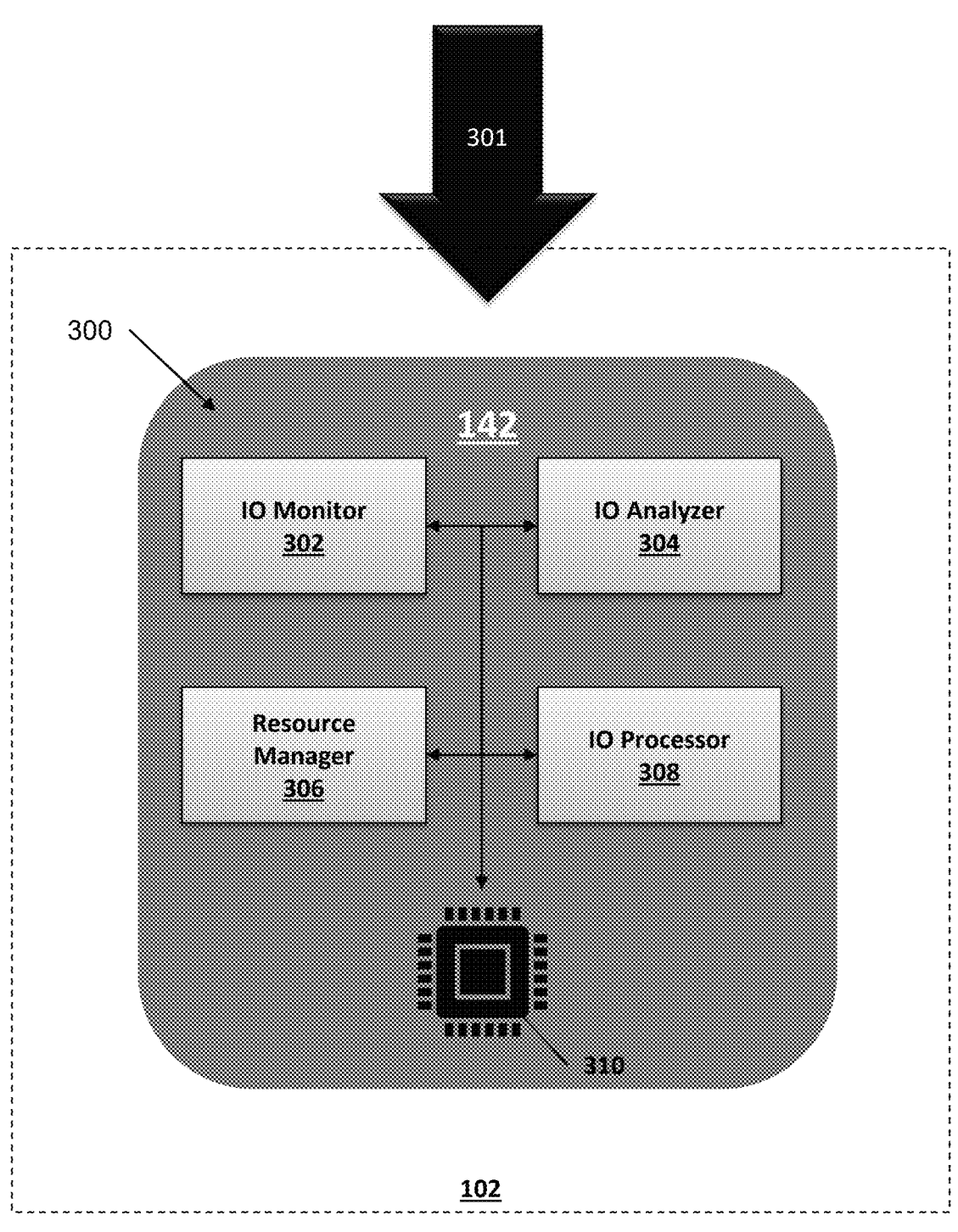
FIG. 3 is a block diagram of a controller in accordance with embodiments of the present disclosure.

Regarding FIG. 3, the storage array 102 can receive an input/output (IO) workload 301, including one or more IO operations (e.g., read or write requests). Each IO operation can include metadata defining specific IO characteristics. For example, the characteristics can include the type of operations, size of the operations, IO frequency, access type (e.g., random vs sequential), performance (or latency), throughput, IOPS, data compressibility, and the like.

In embodiments, IO operations can be categorized into read operations, where data is retrieved from storage (e.g., persistent storage 116), and write operations, where data is written to storage. Each type can impact the performance of the storage array 102 differently and require different handling strategies. Additionally, the data size involved in each IO operation can vary significantly. IO operations can involve small amounts of data (small IO) or large blocks of data (large IO). The size influences how data is buffered and processed and affects system latency and throughput. Further, IO frequency can refer to the rate at which IO operations are received by the storage array 102. High-frequency IO operations can lead to burst workloads, which are intense periods of activity that can strain system resources.

In embodiments, IO operations can be random, with data accessed at non-contiguous storage locations or sequential, where data is accessed in a contiguous manner. Random access is typically more resource-intensive and slower than sequential access due to the additional seek time involved. For example, latency IO operations can be random, with data accessed at non-contiguous storage locations or sequential, where data is accessed in a contiguous manner. Random access is typically more resource-intensive and slower than sequential access due to the additional seek time involved. Further, throughput is the amount of data transferred over a given period. High throughput is essential for efficiency in environments dealing with large volumes of data.

In embodiments, IOPS (Input/Output Operations Per Second) is a standard measure for storage array performance. IOPs indicate the maximum number of reads and writes to storage that can be completed in one second. In addition, data compressibility refers to the extent to which data corresponding to IO write operations can be compressed. The compressibility affects storage efficiency (e.g., data transfer and storage costs).

In embodiments, the storage array 102 can include a controller 142 with logic and hardware elements 300 configured to process the IO workload 301 and its corresponding IO operations. For example, the controller 142 can include an IO monitor 302 that continuously tracks IO workloads 301 received by the storage array 102. For example, the IO monitor 302 can monitor both IO read and write requests in the IO workload 301 to determine their impact on the performance of the storage array 102 during, e.g., burst periods. Further, the IO monitor 302 can establish time window thresholds to observe and analyze the flow of IO operations. Establishing time window thresholds allows the IO monitor 302 to identify bursts in an IO workload 301, as well as the duration and intensity of a burst.

In embodiments, the IO monitor 302 can identify storage groups targeted by IO operations in the IO workload 301. A storage group can correspond to a logical grouping of storage devices/volumes (physical or logical) in the storage array 102. Further, each storage device can include one or more extents. For example, the IO monitor 302 can continuously monitor the IO operations processed by each storage group. The monitoring can include tracking the number, type (read/write), size, and frequency of the IO operations targeting each storage group. By analyzing these parameters in real-time, the controller 142 can detect unusual spikes or patterns that can indicate the onset of a burst workload as described in greater detail herein.

The IO monitor 302 can also monitor the utilization of resources like CPU, memory, and disk space corresponding to each storage group. High resource utilization can often correlate with burst activities, and monitoring these metrics helps assess each storage group's overall health and performance capacity. Further, the IO monitor 302 can maintain, in a local memory 310, a data structure or log of data, metrics, parameters, and the like corresponding to the monitored IO operations and IO workloads 301.

In embodiments, the controller 142 can include an IO analyzer 304 configured to analyze the information corresponding to the IO workload 301 and its IO operations monitored by the IO monitor 302. For example, the IO analyzer 304 can analyze current and historical IO workloads (e.g., IO workload 301) received by the storage array 102. The analysis can include determining one or more characteristics of each of the IO workload's IO operations. For example, each IO operation can include metadata associated with an IO type, data track related to the data involved with each IO, time, performance metrics, and the like.

Based on historical and current IO characteristic data, the IO analyzer 304 can identify one or more IO workload patterns and their corresponding IO request patterns. Further, the IO analyzer 304 can determine the array's resources' activity levels related to the historical workloads, current IO workload, and respective IO request patterns. The resources can include one or more portions of the storage array's persistent storage 116, memory 114, and processors 144 of FIG. 1.

The IO analyzer 304 can generate one or more IO workload models from the identified patterns. Each workload model can include predictions related to future IO workloads, each future workload's IO patterns, and storage array resource activity levels. Further, each workload model can include policies and instructions for classifying and processing future IO requests.

In embodiments, the IO analyzer 304 can extract each IO request's metadata to identify each request's characteristics. The IO analyzer 304 can generate a searchable IO request data structure with a schema that facilitates machine learning (ML) processing. For example, the analyzer 304 can select an ML technique based on each request's distinct metadata type. Based on the selected ML technique, the analyzer 304 can establish a data schema for the IO characteristics data structure and store the data structure in the local memory 310. Using an ML technique, the IO analyzer 304 can determine patterns corresponding to the historical workloads, current workload, each workload's IO requests, and the storage array resources' activity levels.

In embodiments, the IO analyzer 304 can include an ML engine (not shown) that can perform one or more self-learning techniques. The ML engine can include hardware and logic forming a recursive neural network that identifies any patterns of each IO characteristic data structure's records. An example pattern can correspond to patterns of each workload's and IO request's identified LUNs. The ML engine can further determine each LUN's related physical address space using an address space lookup table stored in, e.g., the local memory 310 or the array's memory 114. As such, the ML engine can generate patterns corresponding to each portion of the array's storage resources.

In embodiments, the IO analyzer 304 can use the IO workload models to identify burst workloads. For example, the IO analyzer 304 can define a threshold of IO operations per second (IOPS) based on history and current workload data. The IO analyzer 304 can use the IOPS thresholds to pinpoint when the volume of IO operations exceeds normal operation conditions, signaling a burst workload.

In embodiments, the IO analyzer 304 can use the IO workload models to establish IO signatures for IO workloads and their corresponding IO operations. For example, the IO analyzer 304 can perform a time series analysis of historical and current IO workloads and their corresponding IO operations to model and predict workload patterns. Further, the IO analyzer 304 can use the IO signature to characterize IO activity patterns and match the signature against predefined IO shapelets. The predefined IO shapelets can define specific types of burst workload patterns. For example, the IO shapelets can be small, time-limited patterns that capture distinctive burst characteristics. By matching current IO activity (e.g., IO signatures) to known IO shapelets, the IO analyzer 304 can predict the likelihood and nature of an upcoming burst.

In embodiments, the IO analyzer 304 can determine the intensity of IO workload activity corresponding to each storage group during any given time window. For example, the IO analyzer 304 can generate a Burst Heat Index (BHI) that scores the activity level of each storage group during each time window. The IO analyzer 304 can use a scoring system biased towards write operations, reflecting their more significant impact on storage array performance.

Further, the IO analyzer 304 can determine when specific extents (segments of storage space) corresponding to each storage group should be considered to contribute significantly to burst activity. In embodiments, the IO analyzer 304 can establish a BHI learning threshold to determine if an extent contributes to a burst activity. The IO analyzer 304 can determine the BHI learning threshold based on the overall activity levels within the storage array 102. Specifically, the IO analyzer 304 can use an Exponential Moving Average (EMA) of the total IO workload received by the storage array 102 (e.g., the combined read and write operations across the array 102).

For example, the IO analyzer 304 can establish a maximum workload (MaxWL) metric, representing the total IO workload score for the array 102 over a certain half-like (e.g., 2 weeks). Accordingly, the IO analyzer 304 can use the BHI learning threshold to evaluate the activity level of individual extents of a storage group. If an extent's score exceeds the BHI learning threshold, the IO analyzer 304 can mark it as part of the burst workload.

In embodiments, the controller 142 can include a resource manager 306 configured to manage the storage array's resources (e.g., memory, persistent storage, processors, etc.). Based on historical and current resource utilization determined by the IO analyzer 304, the resource manager 306 can allocate resources to handle burst workloads. For example, the resource manager 306 can allocate a portion of the storage array's persistent storage (e.g., persistent storage 116) to temporarily destage IO write requests and their corresponding data to disk during burst workloads. In particular, the resource manager 306 can determine the capacity corresponding to all the extents and storage groups marked as part of the burst workload. Based on the determined capacity, the resource manager 306 can allocate the portion of the storage array's persistent storage to temporarily destage IO write requests and their corresponding data to disk.

Further, the resource manager 306 can divert resources allocated to handle background or internal storage array tasks to handle the burst workload. Accordingly, the resource manager 306 can establish a delay period (e.g., delay period 406 of FIG. 4) after a burst period (e.g., the burst period 404 of FIG. 4) to perform the background or internal storage array tasks. The resource manager 306 can establish a duration for the delay period by determining the resources available to perform background or internal storage array tasks delayed during the burst period. Additionally, the resource manager 306 can establish a self-healing period (e.g., the self-healing period 408 of FIG. 4) to compress the data temporarily stored during the burst period and destage the compressed data to disk. The resource manager 306 can establish a duration for the self-healing period by determining the resources available to perform data compression after the delay period.

In addition, the controller 142 can include an IO processor 308 configured to process the IO workload 301 and its corresponding IO operations. In embodiments, the IO processor 308 can compress the temporarily stored data during the self-healing period. For instance, the IO processor 308 can determine the compressibility of the data corresponding to each IO write operation in a burst workload of an IO workload (e.g., the IO workload 301). In particular, the IO processor 308 can perform initial compressibility tests on small segments of the temporarily stored data corresponding to each extent and storage group. For example, the IO processor 308 can apply an initial compression algorithm to the small segment to determine how much the data size can be reduced without significant processing overhead.

Based on the initial compressibility test, the IO processor 308 can select an appropriate compression technique from a set of available compression techniques. For instance, the compression techniques can vary in their efficiency, processing/resource consumption, and requirements. The compression techniques can include light and heavy compression algorithms. A light compression algorithm is used for less compressible data or when storage array resources are heavily utilized. Heavy compression algorithms are applied to highly compressible data or when storage array resources are more available. A heavy compression algorithm is more process-intensive but achieves a higher reduction in data size.

Figure 4:
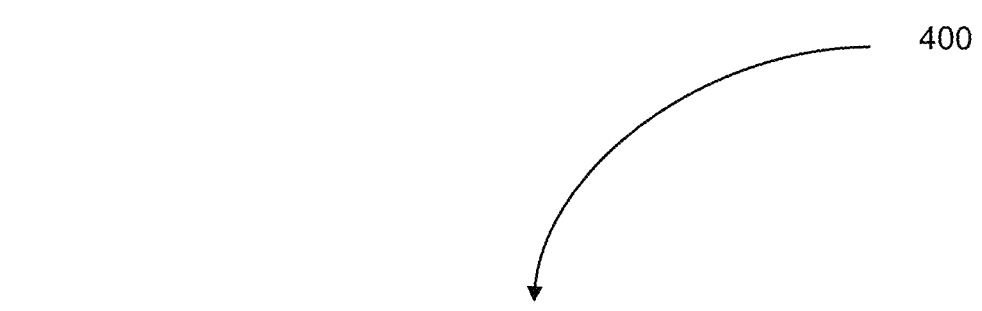
FIG. 4 is a graph of input/output operations per second (IOPS) over time in accordance with embodiments of the present disclosure.
Figure 4:
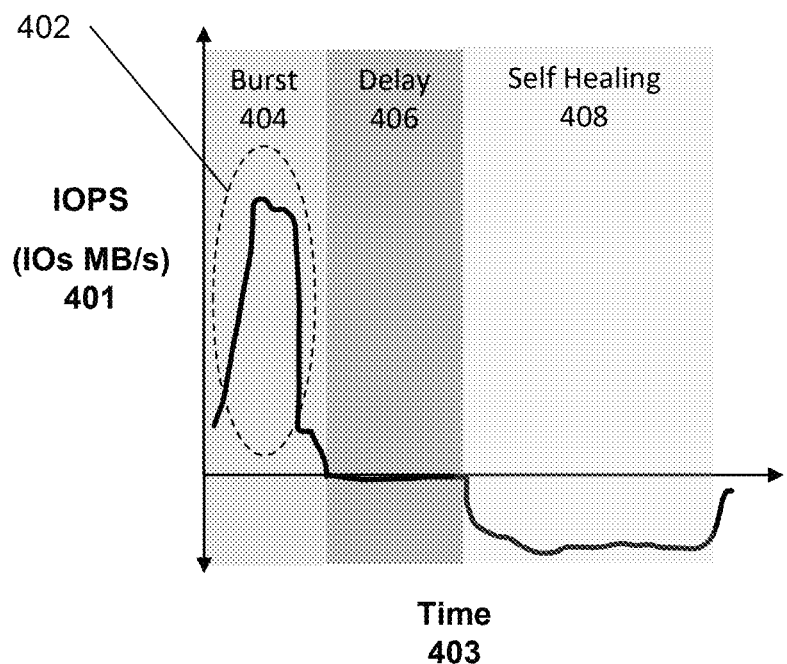

Regarding FIG. 4, a graph 400 plots IOPS 401 over time 403. The graph 400 shows a burst period 404 with an IO signature 402. In embodiments, a controller (e.g., the controller 142 of FIG. 3) can match the IO signature 402 to one or more shapelets (not shown) to determine whether the storage array (e.g., the array 102 of FIGS. 1 and 3) is experiencing a burst workload as described in greater detail above. In addition, the controller 142 can establish a delay period 406 after the burst period 404 to perform background tasks that were delayed to handle the burst workload. After the delay period 406, the controller 408 can establish a self-healing period 408, during which the controller can apply dynamic data reduction techniques to temporarily stored data during the burst period 404, as described in greater detail above.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Regarding FIG. 5, a method 500 relates to managing data reduction in a storage array during burst workloads. In embodiments, the controller 142 of FIG. 1 can perform all or a subset of operations corresponding to the method 500.

For example, the method 500, at 502, can include monitoring input/output (IO) operations received by a storage array to identify a burst workload based on a predefined threshold of IO operations per second (IOPS). Additionally, at 504, the method 500 can include deferring compression of data corresponding to IO write operations in the burst workload during the identified burst workload by temporarily storing the data in an uncompressed format. Further, the method 500, at 506, can include compressing the data during a self-healing period after a delay period. For example, the delay period can be after the identified burst workload.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise when computer programs run on the respective computers and have a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

monitoring input/output (IO) operations received by a storage array to identify a burst workload based on a predefined threshold of IO operations per second (IOPS), wherein the monitoring includes tracking a number, type, size, and frequency of IO operations targeting each storage group of the storage array and maintaining a data structure of metrics corresponding to the monitored IO operations;

deferring compression of data corresponding to IO write operations in the burst workload during the identified burst workload by temporarily storing the data in an uncompressed format, wherein the deferring includes allocating a portion of persistent storage to temporarily destage the IO write requests and their corresponding data to disk during the burst workload; and compressing the data during a data compression self-healing period after a delay period, wherein the delay period is after the identified burst workload, and wherein the data compression self-healing period is a period when the storage array has available resources to perform compression operations on the temporarily stored uncompressed data, and wherein the data compression self-healing period is triggered by detecting that the storage array has transitioned from a high resource utilization state during the burst workload to a lower resource utilization state with processing capacity available for background compression operations.

2. The method of claim 1, further comprising:
defining a duration of the delay period based on an availability of storage array resources.

3. The method of claim 1, further comprising:
defining a start and duration of the self-healing period based on available idle resource utilization of the storage array, wherein the available idle resource utilization represents unused processing capacity of the storage array.

4. The method of claim 1, further comprising:
determining a compressibility of the data corresponding to each IO write operation in the burst workload; and
applying adaptive compression algorithms to the data based on the determined compressibility of the data.

5. The method of claim 4, further comprising:
selecting between light compression and heavy compression based on a current load of the storage array and the compressibility of the data, wherein the storage array's current load refers to the level of resource utilization of the storage array at a given time.

6. The method of claim 1, further comprising:
identifying the burst workload by calculating a Burst Heat Index (BHI) for each storage group in the storage array based on a score biased towards IO write operations.

7. The method of claim 6, further comprising:
identifying each storage group targeted by IO operations in the burst workload using the BHI.

8. The method of claim 1, further comprising:
identifying an IO signature of the IO operations received by the storage array.

9. The method of claim 8, further comprising:
determining whether the IO signature of the IO operations matches an IO shapelet defining a burst workload type.

10. The method of claim 9, further comprising:
defining a burst workload type based on a threshold of IOPS received by the storage array during a time window threshold.

11. An apparatus with a memory and processor, the apparatus configured to:
monitor input/output (IO) operations received by a storage array to identify a burst workload based on a predefined threshold of IO operations per second (IOPS), wherein the monitoring includes tracking a number, type, size, and frequency of IO operations targeting each storage group of the storage array and maintaining a data structure of metrics corresponding to the monitored IO operations;
defer compression of data corresponding to IO write operations in the burst workload during the identified burst workload by temporarily storing the data in an uncompressed format, wherein the deferring includes allocating a portion of persistent storage to temporarily destage the IO write requests and their corresponding data to disk during the burst workload; and
compress the data during a data compression self-healing period after a delay period, wherein the delay period is after the identified burst workload, and wherein the data compression self-healing period is a period when the storage array has available resources to perform compression operations on the temporarily stored uncompressed data, and wherein the data compression self-healing period is triggered by detecting that the storage array has transitioned from a high resource utilization state during the burst workload to a lower resource utilization state with processing capacity available for background compression operations.

12. The apparatus of claim 11, further configured to:
define a duration of the delay period based on an availability of storage array resources.

13. The apparatus of claim 11, further configured to:
define a start and duration of the self-healing period based on available idle resource utilization of the storage array, wherein the available idle resource utilization represents unused processing capacity of the storage array.

14. The apparatus of claim 11, further configured to:
determine a compressibility of the data corresponding to each IO write operation in the burst workload; and
apply adaptive compression algorithms to the data based on the determined compressibility of the data.

15. The apparatus of claim 14, further configured to:
select between light compression and heavy compression based on a current load of the storage array and the compressibility of the data, wherein the storage array's current load refers to the level of resource utilization of the storage array at a given time.

16. The apparatus of claim 11, further configured to:
identify the burst workload by calculating a Burst Heat Index (BHI) for each storage group in the storage array based on a score biased towards IO write operations.

17. The apparatus of claim 16, further configured to:
identify each storage group targeted by IO operations in the burst workload using the BHI.

18. The apparatus of claim 11, further configured to:
identify an IO signature of the IO operations received by the storage array.

19. The apparatus of claim 18, further configured to:
determine whether the IO signature of the IO operations matches an IO shapelet defining a burst workload type.

20. The apparatus of claim 19, further configured to:
define a burst workload type based on a threshold of IOPS received by the storage array during a time window threshold.

* * * * *